(12) United States Patent
Rushworth et al.

(10) Patent No.: US 10,221,992 B2
(45) Date of Patent: Mar. 5, 2019

(54) INDEPENDENTLY MOVEABLE MACHINE TOOL

(71) Applicant: ROLLS-ROYCE PLC, London (GB)

(72) Inventors: Adam George Antrum Rushworth, Nottingham (GB); Dragos Aurelian Axinte, Nottingham (GB); John Marcus Allen, Nottingham (GB); James Kell, Nottingham (GB); Ralph Graham Anderson, Lincoln (GB)

( * ) Notice: Subject to any disclaimer, the term of this patent is extended or adjusted under 35 U.S.C. 154(b) by 1060 days.

(21) Appl. No.: 14/206,775

(22) Filed: Mar. 12, 2014

(65) Prior Publication Data

US 2014/0263883 A1    Sep. 18, 2014

(30) Foreign Application Priority Data

Mar. 18, 2013    (GB) .................................. 1304909.3

(51) Int. Cl.
| | |
|---|---|
| *F16M 11/20* | (2006.01) |
| *B25J 9/00* | (2006.01) |
| *B25J 17/02* | (2006.01) |
| *B62D 57/032* | (2006.01) |

(52) U.S. Cl.
CPC ........ *F16M 11/2035* (2013.01); *B25J 9/0057* (2013.01); *B25J 17/0216* (2013.01); *B62D 57/032* (2013.01)

(58) Field of Classification Search
CPC . B23Q 9/02; B23C 1/12; F16M 11/12; F16M 11/2035
USPC ............ 269/71, 289 R, 290, 309; 248/163.1; 408/234, 236; 409/201, 216, 235
See application file for complete search history.

(56) References Cited

U.S. PATENT DOCUMENTS

| | | | |
|---|---|---|---|
| 4,666,362 A | 5/1987 | Landsberger et al. | |
| 4,801,239 A * | 1/1989 | Austad ................ | B25J 17/0266 248/163.1 |
| 4,988,244 A * | 1/1991 | Sheldon ............... | B23Q 1/5462 248/631 |

(Continued)

FOREIGN PATENT DOCUMENTS

| | | |
|---|---|---|
| FR | 2 809 034 A1 | 11/2001 |
| JP | H03-11582 * | 2/1991 |

(Continued)

OTHER PUBLICATIONS

Mar. 11, 2015 Search Report issued in European Application No. 14 15 9246.

(Continued)

*Primary Examiner* — Joseph J Hail
*Assistant Examiner* — J Stephen Taylor
(74) *Attorney, Agent, or Firm* — Oliff PLC

(57) ABSTRACT

A tool holder. The tool holder is mounted to a platform (9) and comprises a plurality of legs (1) extending from respective positions on the platform (9) for connecting the platform (9) to respective positions on the workpiece. Each leg (1) has a first joint system (8a) at its platform end allowing each leg (1) to pivot relative to the platform (9). Each first joint system (8a) has an actuator arrangement (34) having a first operating mode in which the actuator arrangement (34) is configured to apply a load to move the respective leg (1), and a second operating mode in which the actuator arrangement (34) is configured to allow free movement of the respective leg (1).

11 Claims, 6 Drawing Sheets

(56) References Cited

U.S. PATENT DOCUMENTS

| | | | | |
|---|---|---|---|---|
| 5,354,158 A * | 10/1994 | Sheldon | ............... | B23Q 1/5462 248/631 |
| 5,388,935 A * | 2/1995 | Sheldon | ............... | B23Q 1/5462 248/631 |
| 7,261,502 B2 * | 8/2007 | Pasquetto | ................ | B23Q 1/44 409/201 |
| 7,909,551 B2 * | 3/2011 | Waterman | ............. | B08B 9/0808 147/1 |
| 8,225,692 B2 * | 7/2012 | Kock | ................... | B23Q 1/5462 74/490.03 |
| 9,545,697 B2 * | 1/2017 | Whinnem | ........... | B23Q 1/5462 |
| 2003/0005786 A1 * | 1/2003 | Stuart | ................. | B23Q 1/5462 74/479.01 |
| 2006/0288550 A1 * | 12/2006 | Johansson | .......... | B23K 20/1245 29/53 |
| 2006/0291970 A1 * | 12/2006 | Granger | ............. | B23B 51/0413 409/137 |
| 2011/0194906 A1 * | 8/2011 | Allen | ..................... | B23Q 1/545 409/201 |
| 2011/0247446 A1 * | 10/2011 | Namoun | ............. | F15B 15/1447 74/490.01 |
| 2011/0288677 A1 * | 11/2011 | Meidar | ................... | B25J 9/047 700/193 |
| 2012/0137815 A1 * | 6/2012 | Wang | ................... | B25J 19/0066 74/490.05 |
| 2012/0168593 A1 * | 7/2012 | Mekid | ................. | F16M 11/043 248/398 |
| 2013/0061710 A1 * | 3/2013 | Long | .................... | B25J 17/0216 74/490.05 |
| 2013/0164107 A1 * | 6/2013 | Pehlivan | .............. | B25J 17/0266 414/732 |
| 2014/0151947 A1 * | 6/2014 | Brown | .................. | B25J 9/0045 269/58 |
| 2014/0263883 A1 * | 9/2014 | Rushworth | ............ | B25J 9/0057 248/163.1 |
| 2016/0067792 A1 * | 3/2016 | Cardon | .................. | B23B 47/26 408/1 R |

FOREIGN PATENT DOCUMENTS

| | | |
|---|---|---|
| JP | H03-11582 U | 2/1991 |
| RO | 127815 A2 | 9/2012 |
| WO | 2008/084480 A2 | 7/2008 |
| WO | 2010/043284 A2 | 4/2010 |
| WO | WO 2010/043284 A2 | 4/2010 |
| WO | WO 2011/154429 A1 | 12/2011 |
| WO | 2012/052048 A1 | 4/2012 |
| WO | WO 2012/159737 A1 | 11/2012 |

OTHER PUBLICATIONS

Search Report issued in British Patent Application No. 1304909.3 dated Jun. 26, 2013.

* cited by examiner

INDEPENDENTLY MOVEABLE MACHINE TOOL

BACKGROUND

The present invention relates to a machine tool.

Parallel kinematic machine tools using hexapod architectures are proposed in U.S. Pat. Nos. 5,354,158 and 5,388,935. U.S. Pat. No. 7,261,502 proposes an alternative parallel kinematic architecture in which pairs of hinged arms are used to move a tool holder in two orthogonal directions, a linear slide being used to position a workpiece in the third orthogonal direction. WO 10043284 proposes a further kinematic machine tool using a hexapod architecture.

However, while such machine tools can provide advantages over more conventional serial kinematic machine tools, particularly in relation to accuracy of tool positioning, they are generally incapable of independent movement from one location to another. This can be particularly problematic where the machine tool is to be used in cramped environments, such as within a gas turbine engine or a nuclear reactor for example.

French patent no. 2809034 describes a machine tool capable of moving from one location to another. However, this machine tool is only capable of moving across relatively flat, smooth surfaces

SUMMARY

A need has therefore been identified for a compact, low force machine tool capable of maneuvering itself into different locations over uneven surfaces, attaching itself to large uneven workpieces (such as an interiors of reactor pipes in a nuclear reactor, or a fan case of a gas turbine engine) and performing in-situ inspection, maintenance and re-engineering operations, such as milling and thread recovery. It is also desirable to provide a system capable of sensing its surroundings, aligning itself with the feature to be machined and calibrating itself on the feature.

The present invention provides a machine tool which solves some or all of the above problems.

Accordingly, a first aspect of the present invention provides a machine tool comprising:

a tool holder mounted to a platform, and a plurality of legs extending from respective positions on the platform for connecting the platform to respective positions on the workpiece, each leg having a first joint system at its platform end allowing each leg to pivot relative to the platform, each first joint system having an actuator arrangement having a first operating mode in which the actuator arrangement is configured to apply a load to move the respective leg, and a second operating mode in which the actuator arrangement is configured to allow free movement of the respective leg.

Advantageously, the invention provides a machine tool in which the leg actuators can in a first mode apply a load to move the leg such that the machine tool can autonomously move from one position to another position, and in a second mode can allow free movement of the respective leg to allow a machining operation to take place.

Each leg may comprise a second joint system at its workpiece end, the second joint system allowing the respective leg to pivot relative to the workpiece. Each leg may be actuable when the actuator arrangement of the first joint system is in the second operating mode to alter the inter-joint distance between the first and second joint systems, such that by coordinating alterations in the inter-joint distances of one or more legs, the position and orientation of the tool holder relative to the workpiece is controllable.

Each leg may further comprise at its workpiece end an attachment foot for removably attaching the respective leg to the workpiece.

Typically, the legs extend from respective spaced positions around the perimeter of the platform. The respective positions on the workpiece may be correspondingly spaced. In use, when a tool is held by the tool holder, the workpiece positions at which the legs are attached typically surround the workpiece location on which the tool operates.

The attachment feet, being removably attachable to the workpiece, allow the machine tool to be located on and to machine relatively large workpieces. That is, the workpiece can form both a stable base for the machine tool and the object on which the machine tool operates. Further, by avoiding the need for a dedicated base for the machine tool, the tool can be used in confined working environments.

Preferably, the machine tool has four or more legs. For example, the tool may have six legs, which can enable a hexapod architecture. As each leg is actuatable and extends from a respective position on the platform to, in use, a respective position on the workpiece, parallel kinematic control of the tool holder may also be enabled.

One or more of the legs may have telescopically linked sections which allow alteration of their inter-joint distances. Alternatively or additionally, one or more of the legs may have hinged sections which allow alteration of their inter-joint distances.

Preferably, the attachment feet comprise suction cups for removably attaching the legs to the workpiece. Alternatively or additionally, the attachment feet may comprise other attachment means, such as adhesive surfaces and/or magnets.

Preferably, the attachment feet comprise contact sensors to monitor contact between the attachment feet and the workpiece. The contact sensors can provide assurance that the attachment feet have not worked loose during operation of the machine tool. Further, when the attachment feet comprise suction cups, variation in the forces on the machine tool can require changes to the suction vacuum if the machine tool is to be maintained correctly in position. Monitoring the contact between the attachment feet and the workpiece allows the appropriate suction pressure to be supplied.

The first joint systems may be adapted to allow the legs to pivot relative to the platform in all angular directions. Likewise, the second joint systems may be adapted to allow the legs to pivot relative to the workpiece in all angular directions. For example, the first and/or second joint systems can comprise any one or combination of universal joints, ball and socket joints, hinge joints, swivel joints etc.

The first joint system may comprise a ball and socket joint.

The actuator arrangement may comprise a plurality of control cables. A first end of each control cable may be attached to the platform, and a second end of each control cable may be attached to a respective leg such that, in the first operating mode, selective tensioning of one or more control cables causes pivoting movement of the respective leg. The actuator arrangement may comprise three control cables. The control cables may be evenly circumferentially distributed about a leg axis.

The actuator arrangement may be configured to the first operating mode by tensioning of one or more of the control cables, and may be configured to the second operating mode by slackening of each of the control cables.

Each control cable may be selectively tensioned by a respective motor.

In an alternative embodiment, the actuator arrangement may comprise an engagement member mounted to the platform by a mounting arrangement, the engagement member being configured in the first operating mode to selectively apply pressure to a respective leg in a direction substantially normal to the leg axis. The actuator arrangement may comprise first and second engagement members, the first engagement member being configured to act in a direction normal to the second engagement member. A first end of each engagement member may be configured to be slidably moveable relative to one of a surface of the respective leg and the mounting arrangement normal to the direction of pressure, and a second end of each engagement member may be configured to slidably moveable relative to the other of the respective leg and the mounting arrangement along the direction of pressure, and pivotably moveable relative to the other of the respective leg and the mounting arrangement. Consequently, when in the first operating mode, each engagement member can apply pressure to a respective leg to either pivot the leg or maintain the leg in a position, while accommodating relative pivoting movement as the leg moves.

The actuator arrangement may comprise a linear actuator configured to move the engagement member to apply pressure to the respective leg. The actuator arrangement may be configured to the first operating mode by moving the engagement member to an engaged position, and may be configured to the second operating mode by moving the engagement member to a disengaged position. When in the engaged position, the engagement member may engage against a surface of the leg, and when in the disengaged position, the engagement member may be spaced from a surface of the leg. Consequently, the respective leg is pivoted or maintained in position by engagement between the engagement member and the leg.

Preferably, the platform comprises a stator element from which the legs extend, and a movable stage to which the tool holder is attached for moving the tool holder relative to the stator element. In this way, the platform can provide further degrees of freedom or additional flexibility of movement of the tool holder relative to the workpiece. For example, the stage may be movable relative to the stator element in two orthogonal directions. One option for achieving such movement is to provide a stage comprising a rotor element which rotates relative to the stator element, and a linear slide rotated by the rotor element to which the tool holder is attached. Another option is to provide a stage comprising a first rotor element which rotates relative to the stator element, and a second rotor element which rotates eccentrically relative to the first rotor and to which the tool holder is eccentrically attached. A further option is to provide a stage comprising a first linear slide, and a (preferably orthogonal) second linear slide mounted to the first linear slide to which the tool holder is attached.

The machine tool may further have a controller for controlling and coordinating the actuation of the legs.

The machine tool may further have one or more sensors for determining the position and orientation of the tool holder relative to the workpiece.

The machine tool may further have one or more imaging systems for imaging the operation of the machine tool.

The machine tool may further have one or more coordinate measuring machine systems for measuring the machined surfaces produced by the machine tool.

Another aspect of the invention provides a machine tool according to the first aspect attached to and in combination with a workpiece.

Another aspect of the invention provides the use of the machine tool according to the first aspect for machining a workpiece.

BRIEF DESCRIPTION OF THE DRAWINGS

Embodiments of the invention will now be described by way of example with reference to the accompanying drawings in which.

DETAILED DESCRIPTION OF EMBODIMENTS

Figure 1A:
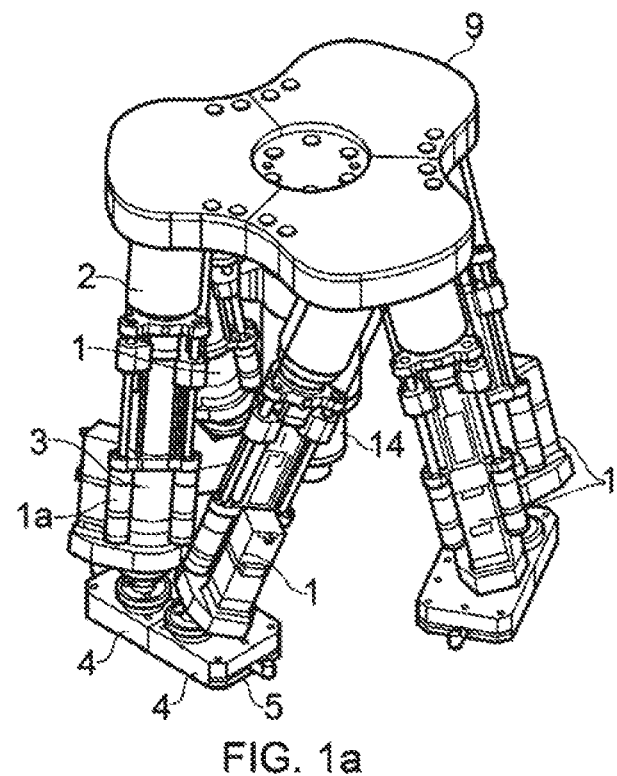
FIGS. 1a and 1b show perspective views of a first machine tool in first and second positions respectively.
Figure 1B:
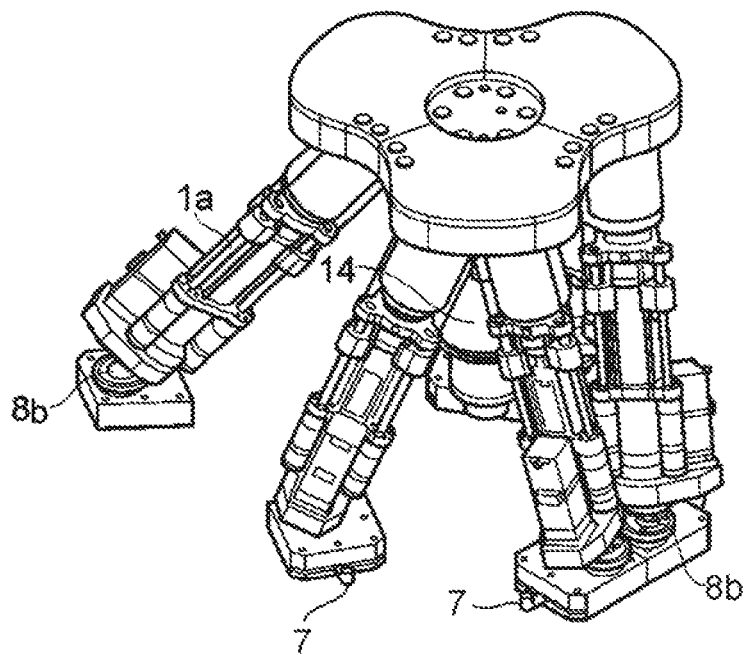
Figure 2:
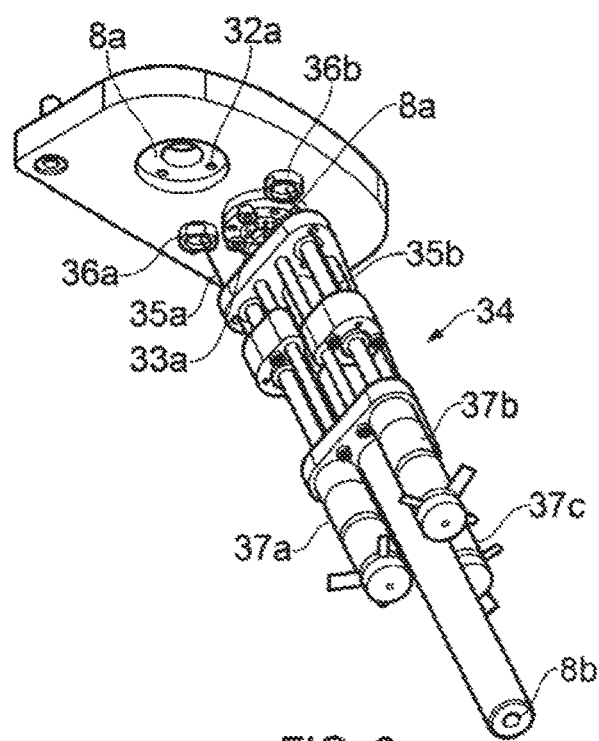
FIG. 2 shows a perspective view from below of part of the machine tool of FIG. 1.
Figure 3:
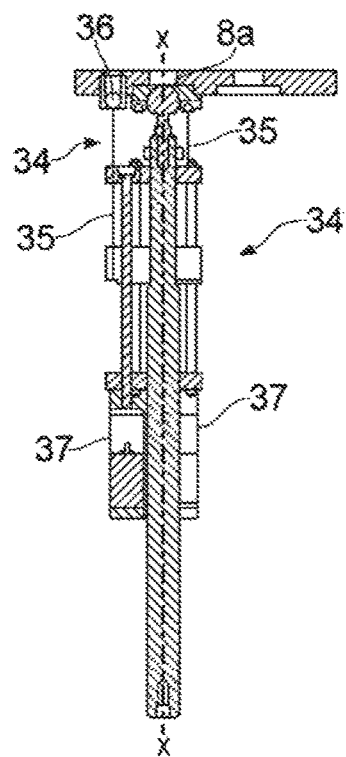
FIG. 3 shows a cross sectional view of the part of the first machine tool shown in FIG. 2.

FIGS. 1 to 3 show a first compact machine tool based on a parallel kinematic hexapod architecture for orbital machining.

The machine tool has a platform 9 on which a tool holding spindle 14 is mounted. The tool also has a positioning system comprising six telescopic legs 1, each leg comprising upper 2 and lower 3 telescopically linked sections. Each leg extends at one end from a respective position on the platform 9 and at the other end has an attachment foot 4 which, in use, removably attaches to a respective position on workpiece.

Attachment of the feet to the workpiece is achieved by means of suction cups 5 at the underside of each foot, although other attachment means such as adhesives or magnets could be used. Vacuum hoses connect the cups to a remote vacuum source (not illustrated) to provide the clamping force. Three spacing pins 7 are disposed around the suction cup and make contact with the workpiece to ensure a constant distance and angle between the foot and the workpiece and to counter any fluctuations in the clamping force or other forces acting on the structure. The pins can be fitted with contact sensors at their ends to ensure they remain in firm contact with the workpiece at all times during the machining process. If adhesive or magnetic attachment means are used in place of the suction cups, the pins may not be needed. However, suction cups generally provide greater operational flexibility as they can be used to attach to a wider range of workpiece materials.

Referring to FIGS. 2 and 3, the legs 1 are connected to the platform 9 by a first joint system comprising upper 8a ball joints. The legs 1 are connected to the feet 4 at their other end by a second joint system comprising lower 8b ball joints. Other joint systems which allow the legs to pivot relative to respectively the platform 9 and the workpiece could also be used. The ball joints 8a, 8b comprise a socket 32a, 32b and a ball 33a, 33b respectively, the ball 33a, 33b being arranged to be captured by the respective socket 32a, 32b such that the leg 1 can pivot freely relative to a respective longitudinal leg axis X.

Each first joint system further comprises an actuator arrangement 34 configured to provide pivoting movement of the respective leg 1. The actuator arrangement 34 has a first operating mode in which the actuator arrangement is configured to apply a load to move the leg 1, or to hold the leg in position thereby preventing free movement of the leg 1, and a second operating mode in which the actuator arrangement 34 is configured to allow free movement of the leg 1.

The actuator arrangement 34 comprises a plurality of control cables 35. In order to provide movement of each leg 1 in two dimensions, at least three control cables 35a, 35b, 35c are required. Each control cable is fixed at its lower end to a respective actuator 37a, 37v, 37c which is in turn fixed to the leg 1, and at its upper end to the platform 9 at respective attachment points 36a, 36b, 36c. Each attachment point 36 is located at a point spaced from the longitudinal leg axis X such that tension applied to the control cable 35 applies a force to the respective leg 1 which urges the leg 1 away from the leg axis X.

Each actuator 37 comprises a linear actuator which is configured to apply tension to the respective control cable 35, and thereby selectively shorten or lengthen the respective cable 35. The actuators 37 can be operated together to configure the actuator arrangement 34 between the first and second operating modes. In the first operating mode, one or two of the actuators 37 are operated to lengthen the respective control cable 35 to provide sufficient slack to enable the leg 1 to move away from the longitudinal axis in one direction. One or two of the actuators are then operated to shorten a respective control cable 35 in order to apply a force to the leg 1 normal to the longitudinal axis, thereby urging the leg 1 away from the longitudinal axis X in a desired direction. In the example shown in the drawings, the cables 35a and 35c are lengthened, and the cable 35b is shortened, thereby moving the leg 1 toward the right to a required position as shown in FIG. 2. Once the leg 1 is moved to the required position, all of the cables 35a, 35b, 35c are held in tension, such that further movement of the leg 1 away from the required position is prevented.

The effect of moving the leg 1 can be seen in FIGS. 1a and 1b. In FIG. 1a, the machine tool is arranged such that the feet 4 of each of the legs 1 is in contact with the workpiece. By applying a force to one side of one of the legs (in this case the leg 1a), the leg 1a can be caused to pivot in a desired direction. By moving each of the legs 1 in a desired direction and back to the longitudinal axis X in sequence, the machine tool can be caused to "walk" in a desired direction, thereby moving the machine tool relative to the workpiece.

The first joint arrangement 8a can be operated in the second operating mode as follows. Each of the actuators 34 of each of the legs 1 is operated to lengthen the respective control cables 35 such that each of the legs 1 is able to pivot freely without restriction caused by the cables 35. Movement of the first and second joint arrangements 8a, 8b can thereby be provided when in the second operating mode by actuation of telescopic sections, as described below.

When the telescope sections of a leg are actuated to alter the distance between the upper and lower joints of that leg, a corresponding alteration is produced in the position and/or orientation of the platform 9 and hence the spindle 14. Coordinated actuation of the telescope sections of all the legs provides motion of the spindle 14 relative to the workpiece with six degrees of freedom. A computer controller (not shown) can provide the actuation commands to each leg.

The suction cups 5 make it possible to fasten the machine directly to workpieces having a range of different geometries. Effectively, when the feet 4 are fastened into place, the workpiece acts as the base for the machine tool.

Figure 4:
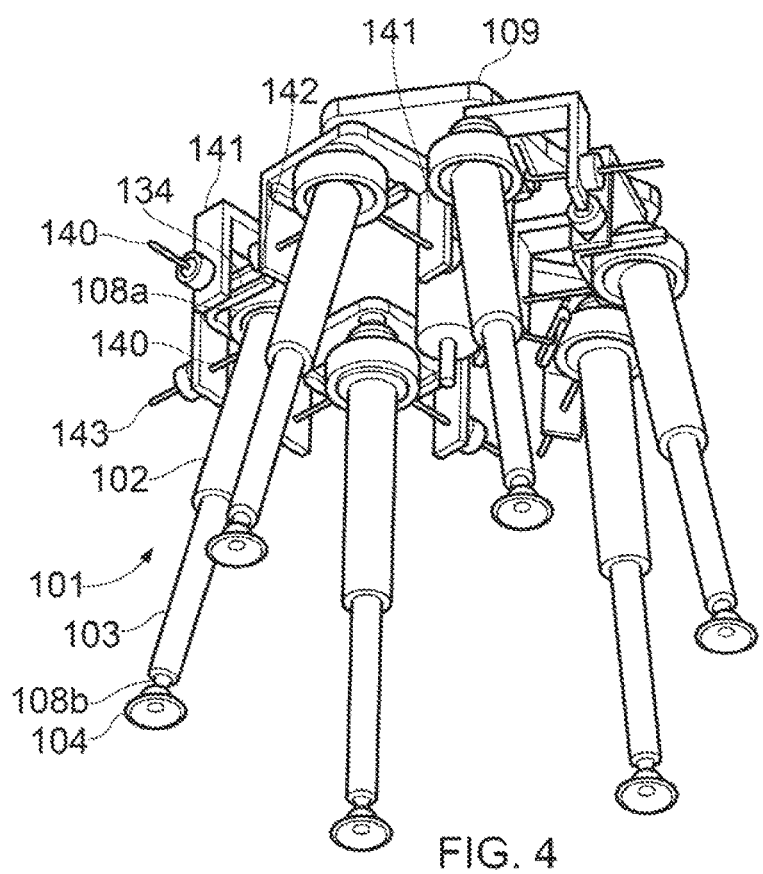
FIG. 4 shows a perspective view of a second machine tool.
Figure 5:
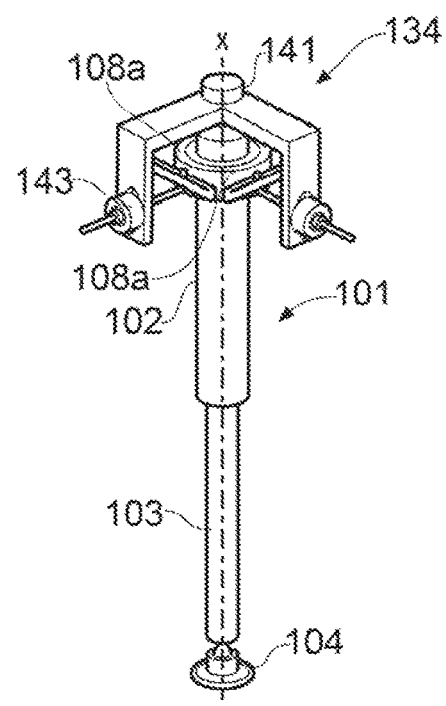
FIG. 5 shows a perspective view of part of the machine tool of FIG. 4.
Figure 6:
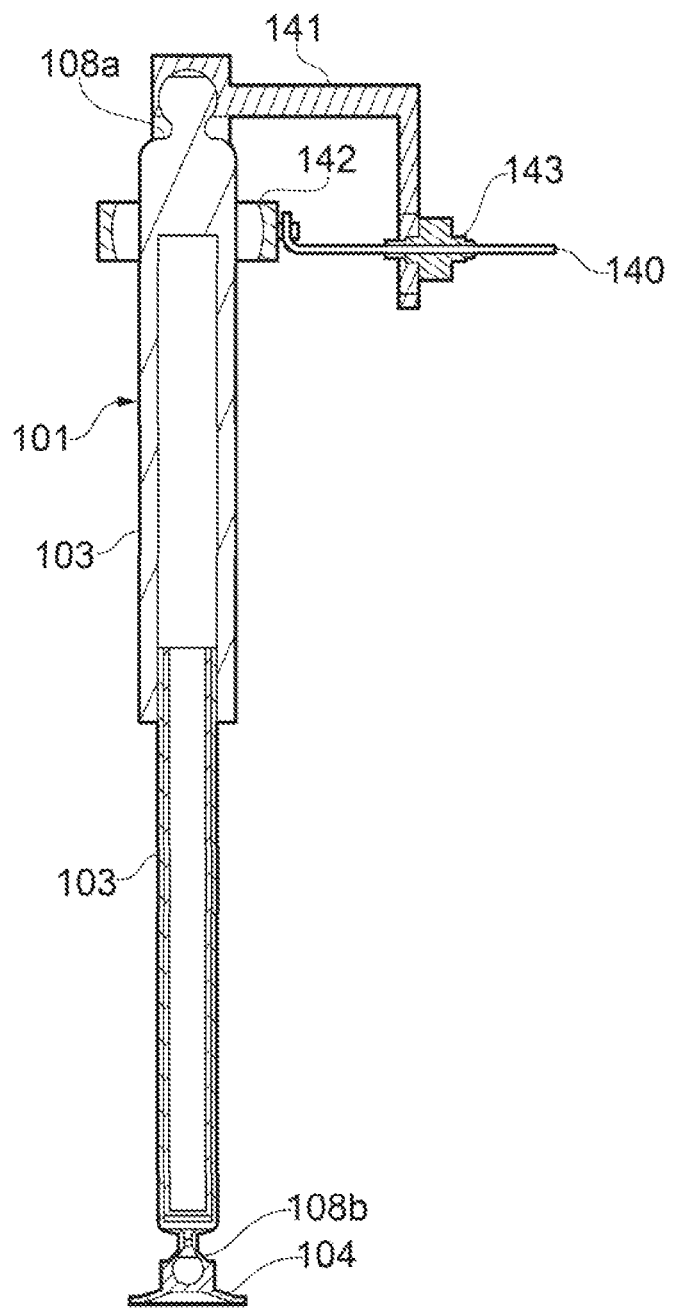
FIG. 6 shows a cross sectional the part of the second machine tool shown in FIG. 5.

FIGS. 4 to 6 show a second machine tool. The second machine tool is similar to the first machine tool, and like reference numerals incremented by 100 are used to describe like features. However, the first joint system 134 of the second machine tool differs to that of the first machine tool.

The first joint system of each leg 101 of the second machine tool comprises upper ball joint 108a, similar to the ball joints 8a of the first joint system 8a. The first joint system further comprises an actuation arrangement 134 configured to provide pivoting movement of the respective leg 1.

The actuation arrangement 134 comprises a pair of substantially rigid engagement members 140 mounted to the platform 109 by a mounting arrangement 141. The mounting arrangement 141 comprises a pair of L-shaped webs which extend from the platform 109 to a linear actuator 143 located part way down the length of the respective leg 101 spaced from the longitudinal axis X of the leg 101. Each engagement member 140 comprises an elongate rod which extends in a direction normal to the longitudinal axis X of the leg 101, is coplanar with the other engagement member, and extends slidably through the linear actuator 143 in a direction generally normal to the direction of the other engagement member 140. The engagement member 140 is configured to selectively apply pressure to a respective leg 101 in a direction substantially normal to the leg axis X.

Referring to FIG. 5, a first end of each engagement member 140 is configured to be slidably moveable along a track 142 relative to the respective leg in a direction normal to the direction of pressure of the respective engagement member 140, and a second end of each engagement member 140 is mounted to the linear actuator 143, such that the second end of each engagement member 140 is slidably moveable relative to the mounting arrangement in a direction normal to the longitudinal axis X of the respective leg 101, and is pivotable relative to the mounting arrangement 141.

The first joint arrangement is operable in either a first or a second operating mode as follows.

In the first operating mode, as shown in FIGS. 4 and 5, the linear actuators 143 are configured to apply a load to the leg 101 to move the respective leg 101 to a different position relative to the longitudinal axis X, or to maintain the respective leg 101 in the required position. The respective leg 101 is thereby urged to a different position.

In the second operating mode, the engagement members 140 are disengaged such that the leg 101 can move freely. The engagement members 140 can be disengaged in one of several ways. In the embodiment shown in FIGS. 4 to 5, the linear actuator 143 comprises a clutch arrangement (not shown) which disengages the engagement member 134 from the linear actuator when the first joint arrangement 108a is configured to the second operating mode. The engagement members 140 are therefore able to move freely, thereby enabling control of the positions of the legs 101 using the telescopic joints 103 (see FIG. 6) during machining, as described above in relation to the first embodiment. The clutch arrangement can be engaged to allow movement of the legs 101 using the engagement members 140, such that the first joint arrangement 134 is operated in the first operating mode. In other embodiments, the engagement members 140 may be disengaged by withdrawing both engagement members 140 from the track 142.

Figure 7:
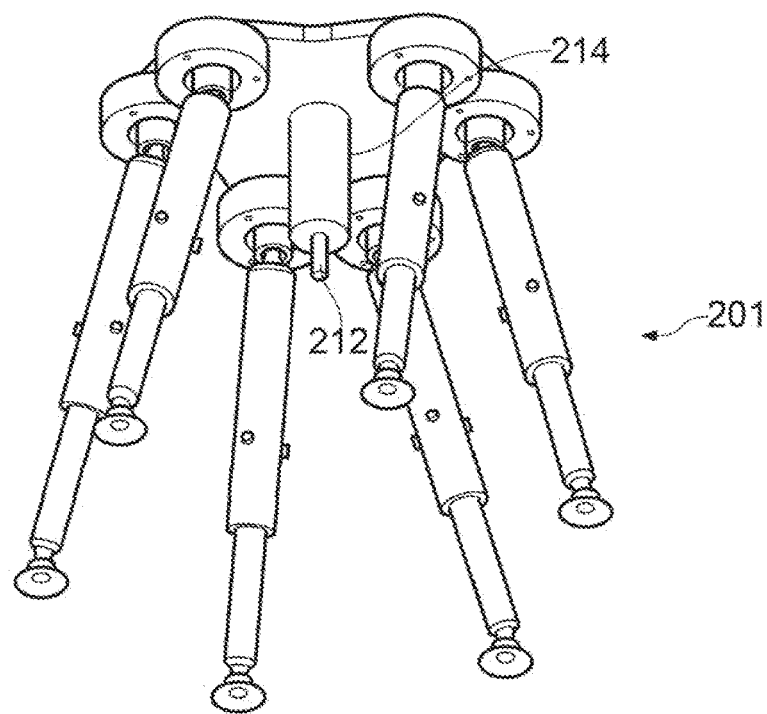
FIG. 7 shows a perspective view of a third machine tool.
Figure 8:
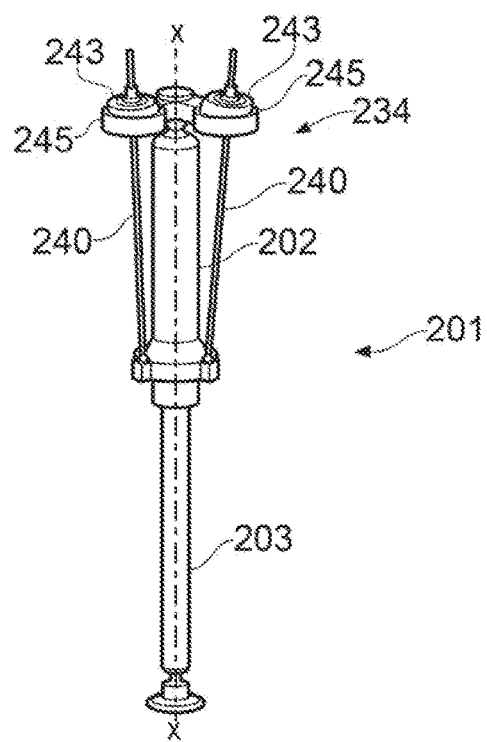
FIG. 8 shows a perspective view of part of the machine tool of FIG. 7.

FIGS. 7 and 8 show a third machine tool which is similar to the first and second machine tools, but again has a different actuation arrangement 234.

The actuation arrangement 234 comprises three substantially rigid engagement members 240. Each engagement member 240 is pivotably attached at a lower end to a mid part of the respective leg 201, and at an upper end to a pivotable mounting 245. The pivotable mounting 245 is configured to pivot about an axis generally parallel to the longitudinal axis X. The pivotable mounting 245 houses a linear actuator 243 which is configured to slidably move a respective engagement member 240 in a generally longitudinal direction X when in the first operating mode. Again, the actuation arrangement 234 can be configured to a second operating mode in which the engagement members 240 disengage in a similar manner to the second embodiment, thereby permitting substantially free movement of the legs 101.

Figure 9:
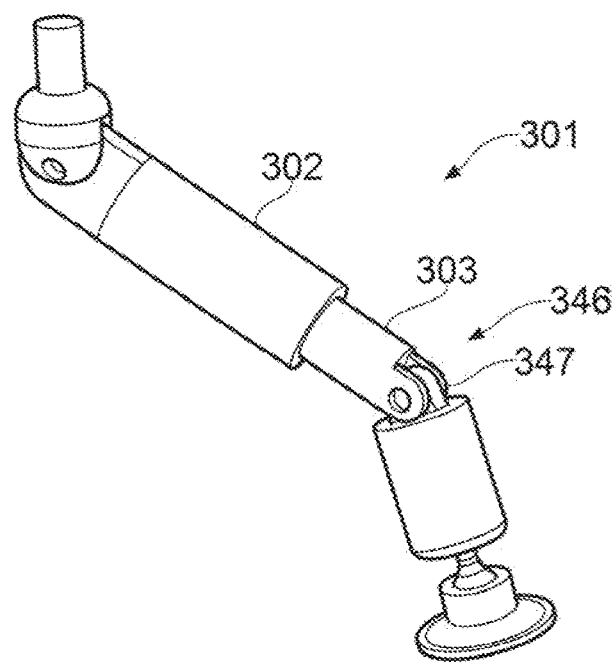
FIG. 9 shows a perspective view of part of a fourth machine tool.

FIG. 9 shows an alternative leg 301 which could be used on any of the first, second or third machines in place of the legs 1, 101, 201. The leg 301 comprises a third joint arrangement 346 located between a distal end of the lower 303 telescopically linked section and the foot 304. The third joint arrangement 346 comprises a hinge 347 which permits pivoting movement about one axis. The third joint arrangement 346 permits greater flexibility of the leg 301 compared to the legs 1, 101, 201 at the cost of increased complexity. The third joint arrangement 346 however reduces the range of telescopic extension that can be provided for a given length leg 301.

Figure 10:
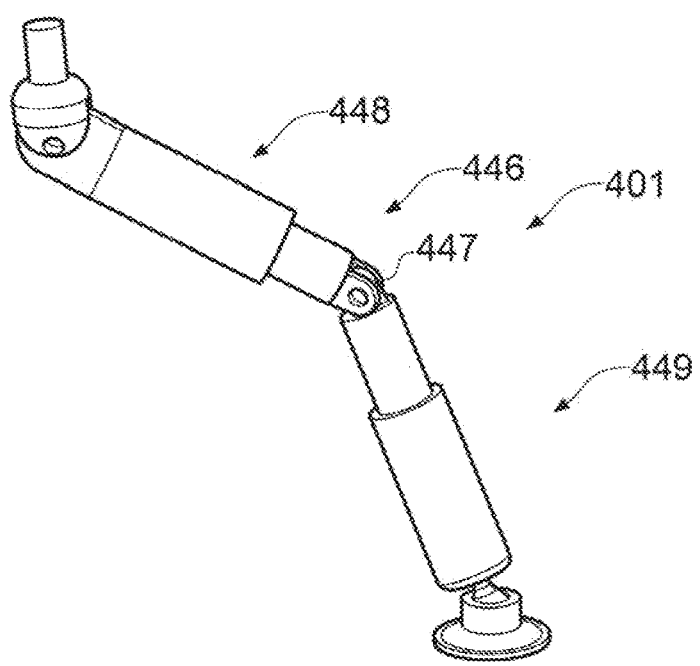
FIG. 10 shows a perspective view of part of a fifth machine tool.

This problem may be solved by the provision of a leg 401 (shown in FIG. 10) having further upper 448 and lower 449 telescopically linked sections on the distal end of the leg 401 distal to a third joint arrangement 446 comprising a hinge 447.

Advantageously, the machine tool is easily transportable and is capable of being temporarily fastened to relatively large workpieces and operating in confined spaces to perform in-situ maintenance and re-engineering operations. The machine tool may be used, for example, for submarine maintenance. However, the machine tool is highly versatile, and may be used in a variety of applications.

Accordingly, the invention provides a machine tool capable of navigating in hazardous environments and performing inspection, repair and maintenance operations without the need for human intervention.

The ability to operate in first and second, i.e. walking and machining modes, allows different actuation arrangements to be used to provide relatively fast walking movement, and relatively accurate machining movement compared to prior designs.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A machine tool comprising:
   a tool holder mounted to a platform; and
   a plurality of legs each having a platform end and extending from respective positions on the platform for connecting the platform to respective positions on a workpiece,
   each leg having a first joint system at the platform end allowing each leg to pivot relative to the platform, and a second joint system at a workpiece end, the second joint system allowing each leg to pivot relative to the workpiece,
   each first joint system having a track and a linear actuator configured to actuate an elongate rod to engage with and disengage from the track to provide pivoting movement of the leg;
   each leg having:
      a first operating mode in which the elongate rod is engaged with the track of the respective leg, and configured to apply a load to pivot the leg, and
      a second operating mode in which the elongate rod is disengaged from the track of the respective leg, and is configured to allow free movement of the respective leg, and
   each leg comprising a telescopic joint actuable independently of the elongate rod to alter an inter-joint distance between the first and second joint systems, such that by coordinating alterations in the inter-joint distances of one or more legs, the position and orientation of the tool holder relative to the workpiece is controllable.

2. The machine tool according to claim 1, wherein each leg further comprises at the workpiece end an attachment foot for removably attaching the respective leg to the workpiece.

3. The machine tool according to claim 1, wherein the legs extend from respective spaced positions around a perimeter of the platform.

4. The machine tool according to claim 1, wherein the plurality of legs comprises four or more legs.

5. The machine tool according to claim 1, wherein each telescopic joint allows alteration of inter-joint distances.

6. The machine tool according to claim 1, wherein one or more of the legs has hinged sections which allow alteration of the inter-joint distances.

7. The machine tool according to claim 1, wherein the first joint system comprises a ball and socket joint.

8. The machine tool according to claim 1, wherein the elongate rod of each leg is mounted to the platform by an L-shaped web having an L-shape and a plane defined by the L-shape, the elongate rod being configured in the first operating mode to selectively apply pressure to a respective leg in a direction substantially normal to the leg axis.

9. The machine tool according to claim 8, wherein a first end of the elongate rod is configured to be slidably moveable relative to one of a surface of the respective leg and the plane of the L-shaped web normal to the direction of pressure, and a second end of the elongate rod is configured to be slidably moveable relative to the other of the surface of the respective leg and the plane of the L-shaped web along the direction of pressure, the second end being configured to be pivotably moveable relative to the other of the surface of the respective leg and the plane of the L-shaped web.

10. The machine tool according to claim 8, the linear actuator being configured to move the elongate rod to apply pressure to the respective leg.

11. The machine tool according to claim 1, wherein the plurality of legs consists of six legs.

* * * * *